Patented July 2, 1929.

1,718,966

UNITED STATES PATENT OFFICE.

WINTHROP STANLEY LAWRENCE, OF BROOKLYN, NEW YORK, ASSIGNOR TO KAUM-AGRAPH COMPANY, OF NEW YORK, N. Y., A CORPORATION OF NEW YORK.

MARKING COMPOSITION.

No Drawing. Application filed January 11, 1926. Serial No. 80,670.

My invention relates to a new and improved transfer ink composition and a new and improved transfer.

One of the objects of my invention is to provide an improved transfer ink composition which is solid at ordinary temperatures so that it can be applied in the molten condition to a paper base to make a transfer having a marking of any desired type, the said ink being releasable from the transfer under the action of heat and pressure to duplicate the said marking on a suitable piece of fabric.

Another object of my invention is to devise a transfer ink and a transfer of this type in which the marking shall be readily soluble in water so that it shall be removed from the garment or fabric upon the first washing thereof.

Other objects of my invention will be set forth in the following description, which illustrates a preferred embodiment of my invention, it being understood that the above general statement is intended merely to explain the same and not to limit it in any manner.

The transfer compositions which have been hitherto commonly used have not been attacked by water alone since they were compounded of resins, waxes and oils. Substances of this class are either absolutely insoluble in a soap solution or they are emulsified only to a very slight extent. However, substances of this class are well adapted to make a fusible composition having a wide range of melting temperature and they are also well adapted to make an ink which can be utilized in connection with an intaglio printing surface.

For many years there has been a large demand for a composition suitable for making a transfer ink of this type, which would be either completely dissolved in water or be sufficiently dissolved or decomposed by water or soap solution so that it should disappear with a little rubbing. For the purposes of my invention a substance of this type should be fusible to the extent that it can be kept liquid for about half an hour or more and it should then be capable of solidifying. Many compositions which are readily decomposed in water or soap solution decompose when heated or very rapidly change their properties when they are liquefied, so that they are unreliable.

The composition which I have found satisfactory and which meets the requirements above mentioned is made up as follows:—

30 parts of soap flakes which have very little free alkali, such as soap flakes of any well known type, are mixed into 50 parts of hot water and 10 parts of glycerol, the liquid constituents being kept at the boiling point until a jelly-like mass is formed. Then 7 parts of caustic soda (sodium hydroxide) are dissolved in the mixture and 70 parts of resin and 65 parts of white powdered shellac are added immediately. The mixture is kept at the boiling point until it becomes homogeneous and it is then heated until the water evaporates, care being taken not to burn the mixture.

After the water has disappeared, 10 parts of beta naphthol are added and then the desired coloring matter is added in the form of bronze powder or any suitable pigment or dye. The coloring matter or agent is, of course, thoroughly intermixed with the other ingredients. The mixture is then panned until it is ready for use.

Of course, it is to be understood that the above example merely illustrates one of the embodiments of my invention and that I do not wish to be limited to the details of the method above set forth, or to a product which is produced only by the above mentioned method.

The final composition has for its major ingredients a mixture of resin acid soaps, namely rosin soap and shellac soap. The composition contains some free rosin, some free shellac and in addition some free caustic soda, since a complete combination under the conditions above mentioned, is rare. The rosin soap and the shellac soap and the soap forming one of the original ingredients of the composition, are combined with glycerine and beta naphthol, both of which make the composition more soluble in water or in a soap solution. The rosin soap and the shellac soap melt to form a liquid without any decomposition, while an ordinary soap, such as sodium stearate or sodium palmitate does not have this desirable property.

The glycerine is more soluble in water than the rosin soap, and this is also true of the beta naphthol. Rosin and shellac are both resins, and consist largely of the resin acids.

This ink composition is solid at ordinary temperatures, it can be readily melted and kept in the molten condition for a substantial period of time without losing its desirable properties and it can be readily printed by means of intaglio printing surfaces so as to form the desired markings upon a paper base, so as to form heat transfers. These markings can then be impressed upon a sheet of fabric or a garment by placing them next to said sheet of fabric or garment and pressing a hot iron upon the paper base of the transfer.

The markings thus formed upon the garment or fabric can be removed by means of a moist rag or in a single washing. The use of this composition is not limited to garments or to fabrics because it can be used upon the face of linoleum, rubber goods, etc., and generally speaking, upon any article in which it is required to make markings removable by water. Soluble dyes can be combined with the composition before mentioned so that fabrics can be dyed by applying a transfer and then treating the fabric with water or the like.

Generally speaking, the above mentioned composition is not only useful in and of itself, but it can be applied to a great many uses by adding other substances thereto, so that the composition above mentioned is of great value as a base for making numerous other compositions. I believe that I am the first to form a transfer ink by combining a resin acid with an alkali and soluble bodies so as to form a fusible composition which is solid at ordinary temperatures, melts without any substantial decomposition, and which is also readily soluble and can be easily dissolved or decomposed by water, and that my invention is pioneer in this respect.

I have described a preferred embodiment of my invention, but it is clear that numerous changes and omissions could be made without departing from its spirit.

I claim:—

1. A solid fusible base for a marking composition including a mixture of rosin soap and shellac soap.
2. A solid fusible base for a marking composition including a mixture of a resin acid soap and the soap of a fatty acid, the said base being decomposable by water.
3. A solid fusible base for a marking composition including the soap of a fatty acid, a rosin soap, a shellac soap, free rosin, free shellac and free caustic soda.
4. A solid fusible base for a marking composition including a resin acid soap and an additional ingredient which is more soluble in water than said resin soap, the said base being decomposable by water.
5. A solid fusible base for a marking composition including a resin soap, glycerine and beta naphthol.
6. In a method of making a solid fusible base for a marking composition, those steps which consist in treating a mixture of a soap of a fatty acid and a resin with glycerine and an alkali.
7. In a method of making a solid fusible base for a marking composition, those steps which consist in saponifying a resin in a mixture of water and glycerine having dissolved therein a fatty acid soap and then evaporating the water.
8. A method of making a solid fusible base for a marking composition which consists in saponifying rosin and shellac in a mixture of water and glycerine containing a dissolved soap of a fatty acid, then substantially evaporating the water, and then adding to the composition a substance which is more soluble in water than a resin soap.
9. A method of making a solid fusible base for a marking composition which consists in saponifying rosin and shellac in a mixture of water and glycerine containing a dissolved soap of a fatty acid, then substantially evaporating the water, and then adding to the composition beta naphthol.

In testimony whereof I affix my signature.

WINTHROP STANLEY LAWRENCE.